Dec. 29, 1959     P. S. SMITH     2,918,843
SYSTEM FOR MOSAIC CINEMATOGRAPHY
Filed Oct. 31, 1956     5 Sheets-Sheet 1
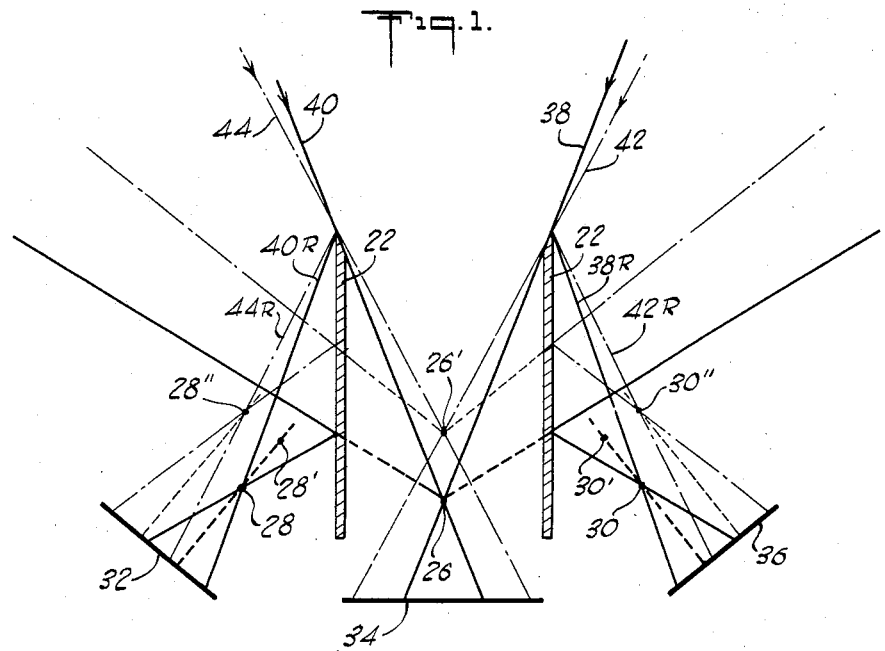
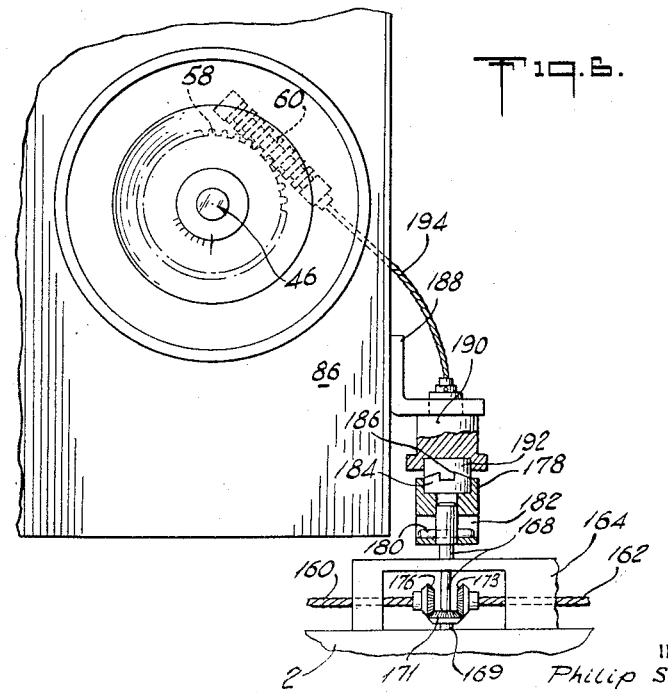
INVENTOR
Philip Stanley Smith
BY
Eyre, Mann & Barrows
ATTORNEYS

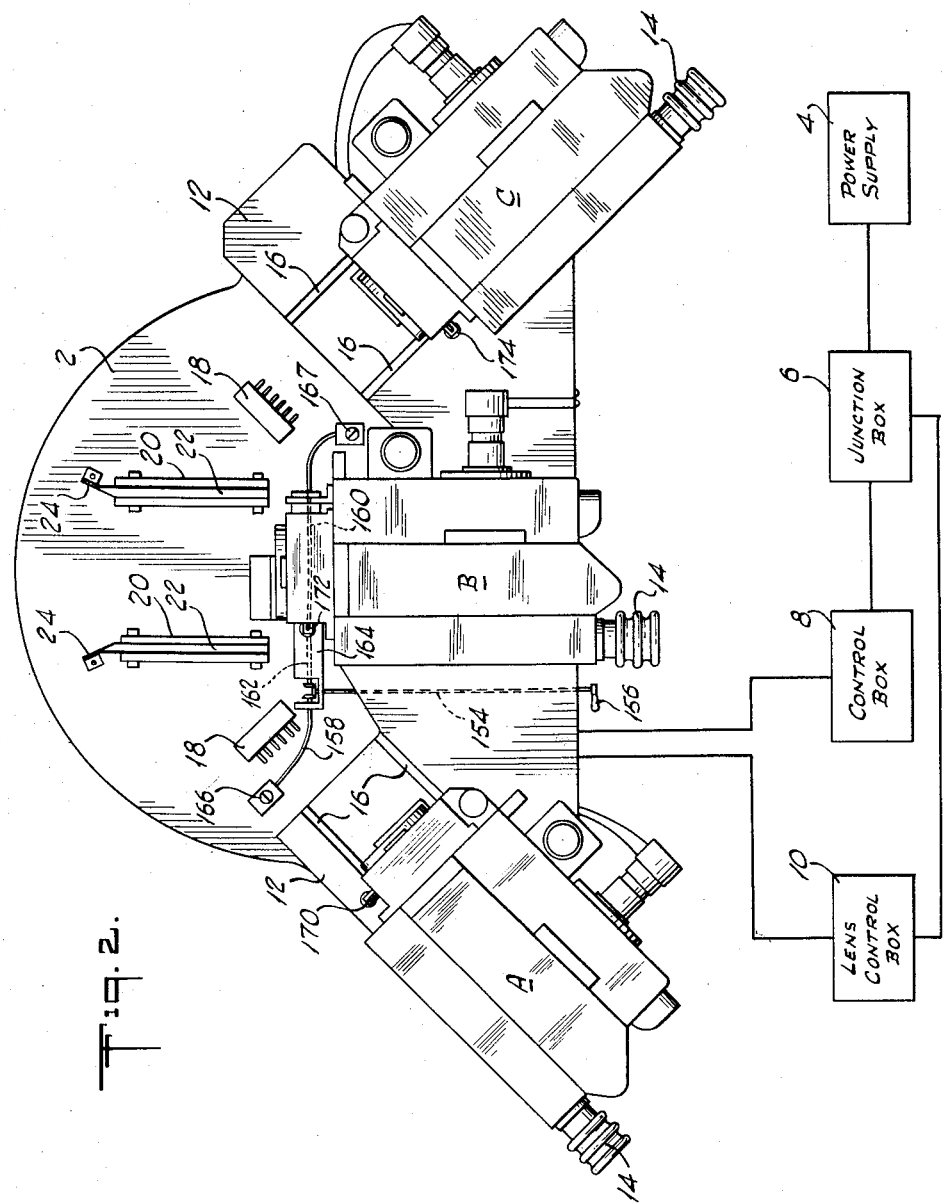

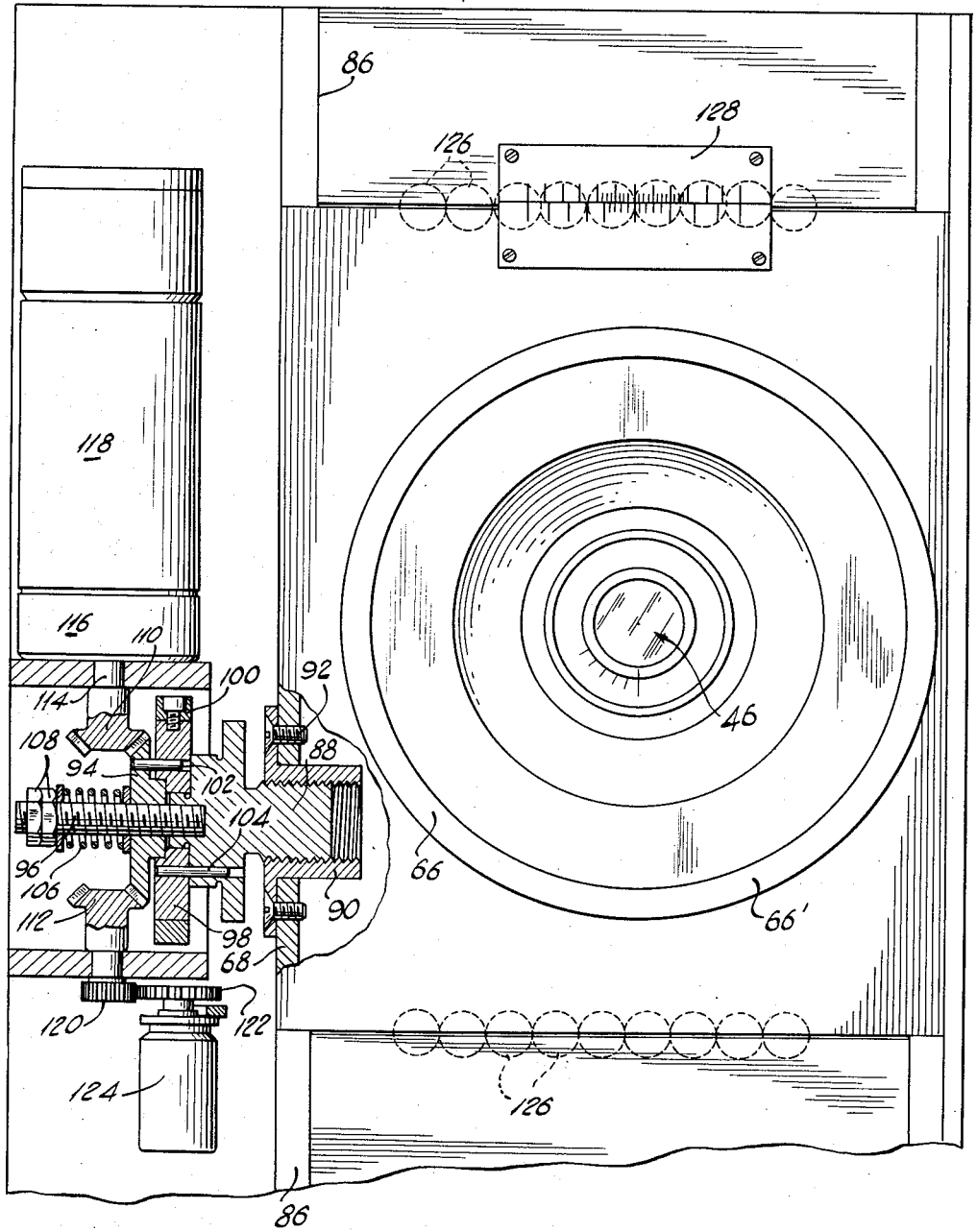

Dec. 29, 1959  P. S. SMITH  2,918,843
SYSTEM FOR MOSAIC CINEMATOGRAPHY
Filed Oct. 31, 1956  5 Sheets-Sheet 4

INVENTOR
*Philip Stanley Smith*
BY
*Eyre, Mann & Burrows*
ATTORNEYS

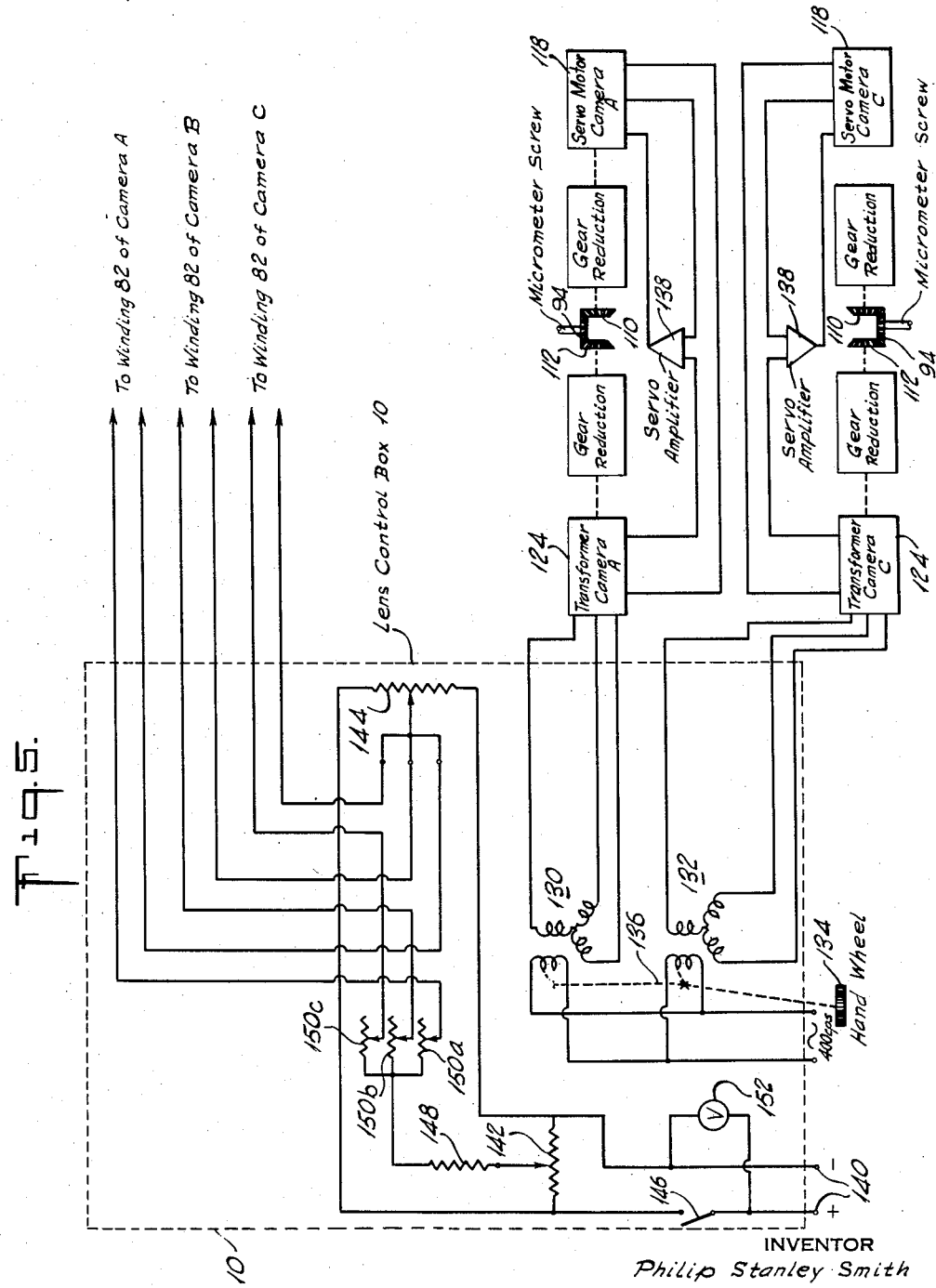

United States Patent Office 2,918,843
Patented Dec. 29, 1959

2,918,843

SYSTEM FOR MOSAIC CINEMATOGRAPHY

Philip Stanley Smith, Camden, N.J., assignor to Smith-Dieterich Corporation, a corporation of New York Application October 31, 1956, Serial No. 619,597

8 Claims. (Cl. 88—16.6)

The present invention relates to mosaic cinematography of the general type disclosed and claimed in my prior pending applications Serial No. 570,369, filed March 8, 1956, and Serial No. 590,995, filed June 12, 1956, and comprises an improved system having novel means for accurate control of movement of the camera lenses for change of focus and having novel means for conjoint control of the iris diaphragms of the cameras.

In mosaic photography or cinematography, as disclosed in my said applications, a plurality of cameras view a scene to be photographed as from a single point, each camera photographing a different portion of the field. Mirrors are employed for maintaining a single optical center from which the cameras effectively view their respective portions of the scene. In the particular case of a three camera setup the entrance pupil of the central camera is physically located at the optical center of the system and each side camera views its respective portion of the field by reflection from a mirrored surface, its entrance pupil being located at the mirror image of the entrance pupil of the center camera. In projection a similar arrangement, utilizing mirrors, is employed to reproduce the photographed field with each projector covering a portion of the field corresponding to that photographed by a corresponding one of the cameras.

A problem which arises in mosaic photography or cinematography of the above briefly described type arises when the lenses of the cameras need to be moved for change of focus. The axes of the side cameras are angularly disposed with respect to the axis of the center camera so that when the lenses are moved forward along their axes for reduction in focus the entrance pupils of the side cameras are no longer in their correct positions for avoidance of parallax. In accordance with the present invention means are provided for so controlling the lens positions of the side cameras as to maintain the proper relationships between the various lens positions irrespective of focus.

To insure equal illumination it is important that the iris diaphragms of the three cameras be controlled in unison. It is also important that the individual cameras be readily retractable to a position for film loading or unloading without disturbing initial camera adjustments. In accordance with the invention novel means are provided for adjusting all the iris diaphragms together when the cameras are in their forward or operative position and for decoupling the iris drive system to permit retraction of a camera without interfering with the iris adjustment. The specific decoupling means comprise permanent magnets which insure predetermined orientation of the driving and driven elements.

The novel means for moving the lenses of the side cameras during change in focus comprises first electromagnetic means controlling axial movement of each lens and second electronic servo control means for moving the lens of each side camera laterally away from its axis and in a direction to insure that the entrance pupil thereof will be so positioned as to view the scene as from the entrance pupil of the central camera. More specifically, the lens of each side camera is mounted in a housing which is movable transversely of the lens axis under control of a micrometer screw driven through gearing by means remotely controlled from a central point. The lens of each camera, including the central camera, is mounted to permit axial movement under control of an electromagnet the current through which is controllable from the same central point.

For a better understanding of the invention and of the novel features thereof reference may be had to the accompanying drawings of which:

Fig. 1 is a diagram explanatory of the movement of the camera lenses with change in focus;

Fig. 2 is a top plan view, partly diagrammatic, of a three camera setup for mosaic photography embodying the invention, certain parts being omitted and other elements of the system being shown by a block diagram;

Fig. 3 is a front view partly in section of the lens housing of one of the side cameras showing elements of the control of the lateral movement thereof;

Fig. 5 is a schematic diagram of the control circuit for the lenses of the three cameras of the system; and Fig. 6 is a detailed view explanatory of the means for controlling the iris diaphragm of a camera.

Figure 4:
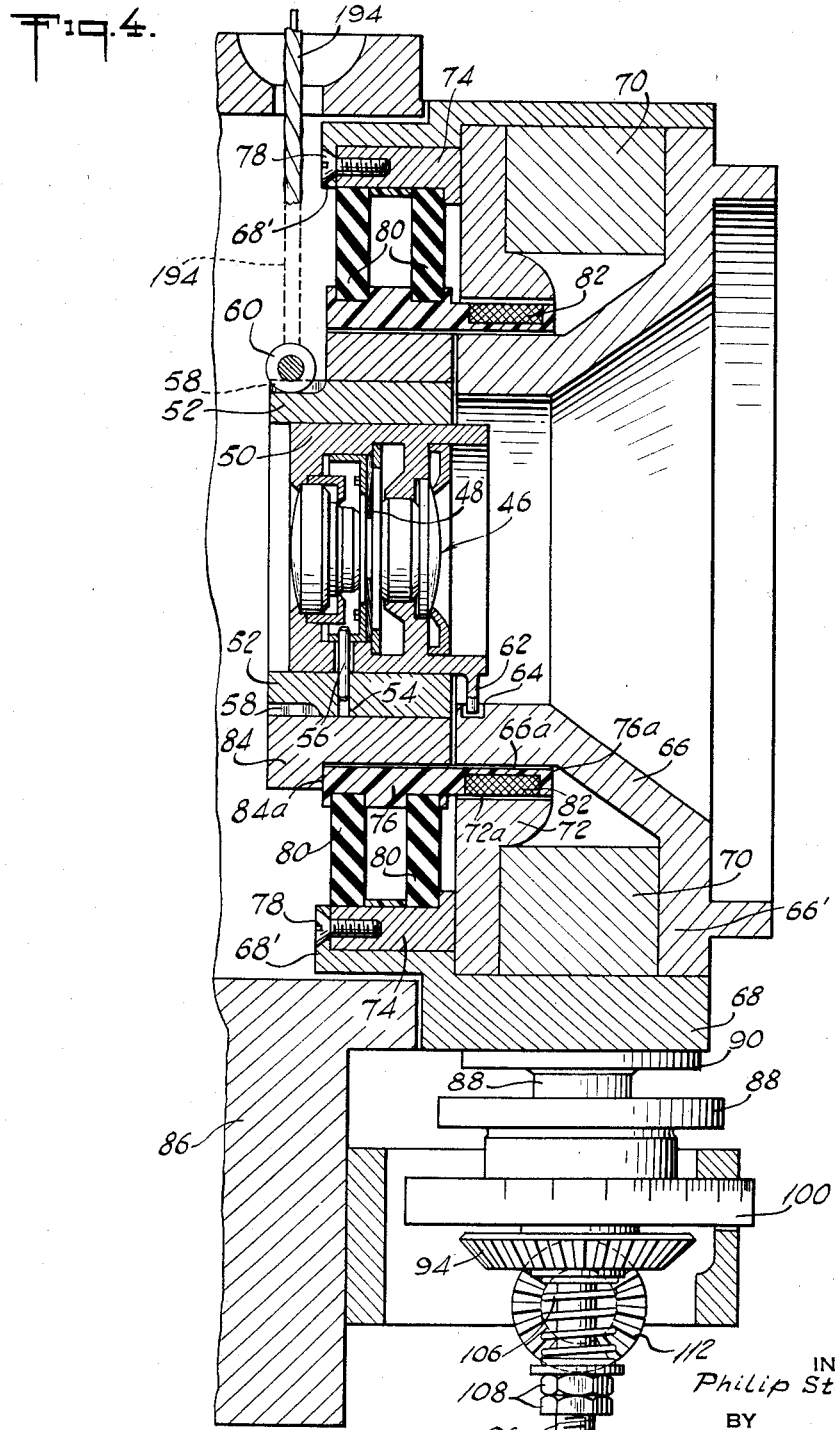
Fig. 4 is a horizontal section view partly in elevation, through the lens housing of one of the side cameras, showing the lens mounting and a part of the iris diaphragm control.

Referring first to Fig. 2 the overall system with which the present invention is concerned is shown as comprising an array of three cameras, a center camera B and side cameras A and C, all of which are mounted on a table 2 and are coupled through electrical cables to the electrical equipment of the system comprising a power supply 4, a junction box 6, which includes in addition to various switches, etc., an inverter for creating a 400 c.p.s., 115 v. alternating current, a control box 8 which contains control means for driving the reels, shutters, etc. (not shown), of the three cameras and a lens control box 10 which contains the control means for the lenses of the three cameras. The lens control box will be described in more detail in connection with Fig. 5. In Fig. 2 only camera B is shown in the forward or operative position, cameras A and C being shown retracted into loading position. The cameras are movable along guideways on a platform 12 supported upon table 2. Each camera is also preferably mounted for transverse movement when in retracted position to permit use of the eye piece 14 for initial adjustment of the camera. In the view of Fig. 2 the mechanical means for permitting these movements have not been illustrated except that the guideways for permitting retraction of the cameras are indicated at 16. Mounted on table 2 are pin terminal boxes 18 which, when the cameras are in their forward or operative position mate with other terminals carried by the cameras for completion of the various circuits thereto. Mounted on the table 2 in frames 20 are wall members 22 which are mirrored on their outer sufaces to reflect to the side cameras the sections of the views to be photographed. The inner walls of the members 22 are non-reflecting. The outer ends of each wall member 22 are beveled to define the field of view of the center camera B. Aligned with each beveled edge of a member 22 is an opaque vane 24 which extends beyond the beveled edge and serves to prevent a side camera from receiving direct rays of light from the portion of the field to be photographed by camera B. Constructionel details of the wall members 22 and vanes 24 form no part of the present invention and reference may be made to the said pending applications for a more full description thereof.

As heretofore mentioned parallax is avoided in mosaic photography when the cameras all view the scene from a single optical center. When conventional lenses are employed in the camera change of focus involving axial movement of each lens disturbs the original relationship between the entrance pupils of the lenses and hence correction must be made for parallax which would otherwise occur. When lenses of the type described and claimed in Dieterich Patents Nos. 1,927,925 and 2,025,731 are employed as in my prior pending applications constant magnification irrespective of focus is obtained and the relationships between the entrance pupils of the lenses remains fixed with change of focus.

The system of the present invention employs conventional lenses but provides means for lateral shifting thereof with change of focus to insure that the desired relationship between the lenses positions is maintained irrespective of focus. This will be better understood by reference to the diagram of Fig. 1 wherein the lens of camera B for infinite focus is represented by the point 26, that of camera A by the point 28 and that of camera C by the point 30. The wall members 22 are shown diagrammatically and the planes of the films for cameras A, B and C are represented by heavy lines 32, 34 and 36 respectively. At these positions of the lenses the point 30 is the mirror image of the point 26 as is also the point 28. The line 38 represents the ray which just clears the end of member 22 and passes through point 26. Line 38R represents the portion of ray 38 that is reflected by member 22 and passes through the point 30 at a distance from the forward end of the member 22 equal to the distance between the point 26 and the forward end of member 22. Similarly line 40 represents the ray which just clears the end of the other member 22 and passes through point 26, 40R the portion of ray 40 that passes through point 28 of camera A. When the focal distance is to be reduced the lenses of the three cameras are moved along their axes away from the respective films and through equal distances. This brings the entrance pupil of camera B to the point 26', the entrance pupil of camera A to the point 28' and the entrance pupil of camera C to the point 30'. It will be understood, for clarity in the drawing, the distance through which each of the lenses are moved has been greatly exaggerated. It will be apparent from the diagram that the points 28' and 30' are not located as mirror images of point 26'. The limiting ray to camera B when the lens has been moved forward to point 26' is now ray 42 and the portion thereof reflected as ray 42R toward camera C does not pass through the point 30'. Similarly the reflected portion 44R of limiting ray 44 does not pass through the point 28'. If the lenses of cameras A and C are shifted laterally, parallel to the films 32 and 36, respectively, to the points 28'' and 30'' the lenses will be in position to receive the rays 44R and 42R. They will also be at positions which are substantially the mirror images of point 26'. The means now to be described in connection with Figs. 2, 3 and 4 insure movement of the lenses of the side cameras to positions corresponding to the points 28'' and 30'' of Fig. 1.

The axial movement of the lens is effected substantially as in my said copending applications except in the present system the lens as a whole is shifted and not merely one element thereof as in the said copending applications. In Fig. 4 a compound lens is indicated generally at 46 and a conventional iris diaphragm positioned between elements of the compound lens is indicated at 48, the lens elements and diaphragm being mounted within a cylindrical member 50. The member 50 is mounted within a sleeve 52 provided with a recess 54 for reception of the operating pin 56 for the diaphragm 48. The sleeve 52 is provided at its rear edge with gear teeth 58 which mesh with a worm gear 60 forming part of the iris control. The forward end of the annular member 50 is provided with a radial projection 62 which enters a longitudinal slot 64 in a member 66 to prevent rotation of the lens when sleeve 52 is rotated to change the iris opening. Forwardly of the slot 64 the member 66 diverges radially and terminates in a ring portion 66' which is mounted in a lens control housing 68. Received within the housing 68 rearwardly of the portion 66' is a number of parts generally indicated by the reference numerals 70, 72, 74 and 76, with the part 70 resting against the inside front wall of the portion 66' of member 66. Members 66, 70 and 72 form parts of a magnetic circuit. Member 70 is a ring shaped permanent magnet preferably made of material as "Alnico" or "Permalloy" which is capable of being strongly magnetized and of long retaining high intensity of magnetization. Ring magnet 70 has one of its faces as the north pole and the other as the south pole. Members 66 and 72 make contact with these end faces and form pole pieces of the above polarities for the permanent magnet 70. These pole pieces are of material of high magnetic permeability, such as soft iron, soft steel or the like, and provide coaxial radially juxta-positioned cylindrical surfaces 66a and 72a forming therebetween a flux gap of great magnetic intensity. Thus the high intensity magnetic flux of the permanent magnet 70 is guided and concentrated in substantially uniform distribution radially across the air gap between the surfaces 66a and 72a. Member 74 is a ring shaped member of non-magnetic material such as brass or the like which abuts one side of the magnetic member 72 and is coaxial therewith. Member 74 is mounted as by screws 78 on an inwardly disposed flange 68' of the housing 68. Member 76 is an annular member of smaller diameter than member 74 and it is radially spaced from member 74 by means of two rings 80 of compressible material such as hard rubber. Member 76 is preferably made of light weight non-magnetic material, preferably non-metallic such as any suitable plastic, for example, Bakelite or Bakelite impregnated with fiber, and is provided with an extension 76a which is disposed in the air gap between the surfaces 66a and 72a and is recessed to provide a seat for a winding 82. The member 76 is secured to an annular shoulder 84a of a retaining ring 84 surrounding the sleeve 52. The forward end of ring 84 is axially spaced from the inner face of member 66 and portion 76a of ring 76 clears the surfaces 66a and 72a to permit lateral movement of the lens assembly when the winding 82 is energized to change the focus of the camera, the compressible rings 80 flexing to permit axial movement of the member 76 and the parts fixed thereto.

For lateral movement of the lens the housing 68 is moved as a whole relative to the supporting framework of the camera, a portion of which is indicated at 86 in Figs. 3 and 4. The means for moving the housing 68 include a micrometer screw 88 (see Fig. 3) which threads into a socket 90 secured to the wall of housing 68 as by screws 92. A bevel gear 94 is secured to the micrometer screw 88 by means of a screw 96. The micrometer screw 88 has a reduced neck portion into which the screw 96 threads and about the periphery of which is mounted a wheel 98 carrying an indicating scale 100 about the periphery thereof. A pin 102 passing through gear 94 and wheel 98 and a pin 104 passing through wheel 98 and into a hole in micrometer screw 88 insure that the gear, wheel and micrometer screw will rotate together. A compression spring 106 is positioned about the externally protruding portion of screw 96 and is held thereon between suitable washers by locknuts 108, the spring and nuts being provided to take up backlash in the parts when the gear 94 is rotated to move the lens housing laterally. Gear 94 meshes with two bevel gears 110 and 112. Gear 110 is fixed on the end of a shaft 114 which is journaled in a fixed part of the camera framework 86 and extends into a housing 116 containing gear reduction mechanism through which the shaft is coupled to the shaft of a servo motor 118. Gear 112 is fixed on the end of a shaft likewise journaled in a part of the fixed framework 86 of the camera and carries a gear 120 which, through gear reduction mechanism, part of which is shown in Fig. 3 at 122, drives the shaft of a synchro control transformer 124. The circuits for the servo motor 118 and for the synchro control transformer 124 will be explained hereinafter in connection with the circuit diagram of Fig. 5. For present purposes it will be sufficient to state that when servo motor 118 is energized to cause rotation of gear 110 the micrometer screw is rotated in one direction or the other to move the lens housing 68 laterally in the housing 86 to cause followup rotation of the shaft of synchro control transformer 124. The electrical circuits are so connected to the servo motor and transformer as to insure that the movement of the micrometer screw has been such as called for by the control setting on the lens control box.

As shown in Fig. 3 the lens control housing 68 is provided at its upper and lower edges with races for accommodating ball bearings 126 and the framework 86 is likewise provided with races for accommodating the ball bearings thereby permitting lateral movement of the control housing in the framework. Preferably, also as indicated in Fig. 3, a plate 128, which is longitudinally split into upper and lower sections each provided along its edge with suitable gradations is secured to the framework and control housing thus yielding an indication of the amount of lateral movement of the housing with respect to the framework.

The circuit for controlling the current delivered to the windings 82 of the three cameras and to the servo motors and synchro control transformers of cameras A and C is shown in Fig. 5 to which reference may now be had. Within the lens control box 10 is located a synchro generator 130 for camera A and a synchro generator 132 for camera C, the movable coils of which are energized from 400 cycle alternating voltage supplied from the inverter (not shown) within the junction box 6 of Fig. 2. The orientation of the movable coils of synchro generators 130 and 132 is controlled by a handwheel, indicated diagrammatically in Fig. 5 at 134, which is available externally of the lens control box and mechanically coupled to the rotors as indicated diagrammatically by the dashed lines 136. The stator coils of synchro generator 130 are connected through a cable to synchro control transformer 124 of camera A and the stator coils of synchro generator 132 are similarly connected through a cable to the transformer 124 of camera C. The electrical output from transformer 124 is impressed, through a servo amplifier indicated diagrammatically at 138, upon the servo motor 118 of camera A to cause rotation of gear 110 and accordingly of the micrometer screw at that camera to a position corresponding to the setting of the handwheel 134 at the control box. Rotation of the micrometer screw causes rotation of gear 112 and therefore, through the gear reduction, rotation of the movable coil of synchro control transformer 124. When the position of the movable coil of the syncho control transformer 124 is brought to that of synchro generator 130, the electrical signal to servo motor 118 ceases. The transformer thus serves as a followup of the position control and insures that the ultimate position of the micrometer screw will be that called for by the setting of handwheel 134. Synchro generator 132 operates similarly through synchro control transformer 124 of camera C and servo motor 118 of camera C to set the micrometer screw of that camera to the setting called for by the handwheel 134. For a given change in focus, the lenses of cameras A and C should be laterally shifted in opposite directions as is apparent from the diagram of Fig. 1. For this reason the movable windings of synchro generators 130 and 132 are oppositely connected across the source of alternating potential as indicated in the circuit diagram. Accordingly when handwheel 134 is moved to a new setting the micrometer screw of cameras A and C will rotate in opposite directions and will move the lens housings through equal and opposite lateral distance.

Also within the control box 10 is a focus control circuit energized through terminals 140 by direct current delivered thereto from the power supply via the junction box. The circuit includes a pair of potential dividers 142 and 144 connected in parallel across the terminals 140 through a manually operable switch 146. An adjustable tap on the divider 142 is connected through a resistor 148 to three parallel circuits each including one of three adjustable resistors 150a, 150b, and 150c, the winding 82 of a camera and a movable tap on divider 144. A voltmeter 152 is connected across the terminals 140. Thus for initial adjustment of the current through the windings 82 controlling the positions of the lenses, the taps on resistors 150a, 150b and 150c may be adjusted whereas for conjoint control of the focus of all three cameras the tap on either divider 142 or divider 144 may be adjusted.

The conjoint control of the iris openings will be briefly described in connection with Fig. 2. Details of the magnetic coupling to each camera will be described in connection with Fig. 6. A shaft 154 supported in any suitable bearings (not shown) extends beneath the platform 12 to drive, through gearing indicated in Fig. 2, flexible shafts 158 and 160 and intermediate shaft 162. Shaft 158 at its end remote from its gear coupling to shaft 154 drives a short vertical shaft one end of which is journaled in the table 2 and the end of which carries a holder for a small permanent magnet comprising part of the coupling on the iris control gear of camera A. Shaft 162 through suitable gearing within an enclosure 164 drives a vertical shaft carrying a holder for a permanent magnet comprising part of the magnetic coupling to the iris control gear of camera B and flexible shaft 160 through gearing, drives a vertical shaft one end of which is journaled in the table 2 and the other end of which carries the holder for the permanent magnet forming a part of the magnetic coupling to the iris control gear of camera C. Part of the magnetic coupling of camera A is indicated in Fig. 2 at 166 and part of that of camera C at 167. The corresponding part for camera B is not visible in Fig. 2 because camera B is in the forward or operative position. In Fig. 2 a part of the iris control shaft and the camera carried part of the magnetic coupling for camera A is indicated at 170, for camera B at 172 and for camera C at 174. Thus, when all cameras are in the forward position and the iris control shafts thereof are coupled together at the magnetic couplings rotation of shaft 154 by adjustment of arm 156 simultaneously rotates the iris control shafts of all the cameras.

In Fig. 6 details of one magnetic coupling are shown. As the magnetic coupling for each iris control is substantially identical the coupling shown in Fig. 6 may be considered as typical of any one of the couplings, although it is specifically the control for the iris diaphragm of camera B. The short vertical shaft driven by shaft 162 is indicated at 168. It is supported at one end in a perch or bearing 169 in the table 2 and carries a gear 171 which meshes with a gear 173 on flexible shaft 162 and with a gear 176 on shaft 160. Above the housing 164 the upper end of shaft 168 has mounted thereon a magnet holder 178 by means of a pin 180 which passes through the shaft 168 and through a slot 182 in the holder, the slot being sufficiently wider than the pin 180 to permit limited vertical movement of the holder 178 on the shaft. Supported in the holder 178 is a permanent magnet 184. The upper surface of the magnet is preferably slightly wedge shaped upwardly and formed with a diametral groove 186 along the apex of the wedge. Mounted on the framework 86 of the camera by means of a bracket 188 is a magnet holder 190 carrying a permanent magnet 192 the lower surface of which is shaped to mate with the upper surface of magnet 184. The holder 190 has a tubular extension for coupling to the flexible shaft 194 the other end of which drives the worm gear 60 of camera A. Each of the magnets 184 and 192 is so magnetized as to have a north pole on one sloping surface and a south pole on the other. Thus they will repel each other except when so oriented that a north pole face of one is presented to a south pole face of the other. When a camera is to be retracted to loading position, the operator presses down on the holder 178 to move it through the distance permitted by the width of slot 182 and thereby separate the magnets. The camera is then retracted to loading position and when returned to operating position the coupling between the two magnets will not be effected until and unless the shafts are in such position that the magnets are properly oriented. Thus the original iris setting of the three cameras is not disturbed by retraction of one or more of the cameras as the magnetic coupling at the forward position of each camera insures against inadvertent change of iris position during retraction of a camera. The magnets may be sufficiently strongly magnetized to cause the lower magnet to be drawn upwardly when the upper magnet is in position thereover. If the magnets are not powerful enough to actually lift the lower magnet it is a simple matter to manually lift the holder 178 into position to couple the magnets. Once the air gap between them is closed, even very small magnets may be sufficiently magnetized to maintain the coupling.

The invention has now been described with reference to a specific embodiment thereof. It will be apparent that the invention provides a novel, practicable and efficient camera arrangement for mosaic cinematography. The means for controlling from a central point both axial and lateral movement of the lenses of three cameras for avoidance of parallax during change in focus results in a system which produces films from which images may be projected simultaneously without visible irregularities at the junction of the images projected from different films. The particular mounting of the lenses in the resilient rings insures exact axial movement of the lens assemblies. The camera structure including the movable lens control housing permits retraction of the camera to loading position without disturbing adjustment of the camera. This insures greater ease of operation and reduces the possibility of misalignment of camera elements when the camera is returned to operative position. The means for conjoint control of the iris diaphragms with the novel magnet coupling therein permits retraction of any camera for reloading or readjustment without disturbing the iris setting. Obviously various changes in the particular mechanical elements illustrated in the drawings and described herein could be made without departing from the spirit of the invention or the scope of the accompanying claims. Although the drawings have illustrated the novel features of the invention, various conventional elements, or parts, with which the present invention are not concerned have not been shown. For example, the shutters, the drive means therefor and the reels and their drive means, all of which form part of any complete system have not been illustrated or described. Certain of these elements have been shown and described in my prior pending applications to which reference may be had for a more complete description.

The following is claimed:

1. A multi-camera mechanism for mosaic cinematography of a wide angled scene comprising a horizontal support platform, a vertical wall member mounted thereon, one surface of said wall member being mirrored, two cameras carried on said platform with the axes of their lens systems in a common horizontal plane, one camera being oriented to view one section of the scene by reflection from said mirrored surface and the other camera being oriented for direct view of an adjacent section of the scene and with its lens system located substantially at the location of the image of the lens system of said one camera, housing means in each camera for supporting the lens assembly thereof while permitting axial movement of the lens assembly for change of focus, each camera including a framework enclosing said housing means, a micrometer screw extending through an opening in the framework and threaded to the housing means of said one camera, said screw when rotated moving said housing means transversely of the direction of the optical axis of the lens system supported thereby, and means for remotely controlling rotation of said screw comprising a synchro transformer and servo motor energized therefrom and each having a movable coil gear coupled to said micrometer screw, said transformer and servo motor being carried by said framework, and a remote synchro generator having an adjustable movable coil and having a fixed coil electrically connected to the fixed coil of said synchro transformer.

2. The multi-camera mechanism according to claim 1 including a second vertical wall member having one mirrored surface and mounted on said platform, a third camera carried on said platform with the axis of its lens assembly in said common horizontal plane, said third camera being oriented to view by reflection from the mirrored surface of said second wall member a section of the scene adjacent that viewed directly by said second mentioned camera, housing means in said third camera for supporting the lens assembly thereof while permitting axial movement of the lens assembly for change of focus, said third camera also including a framework enclosing said housing means, a micrometer screw extending through an opening in said last mentioned framework and threaded into the housing means therein, a second synchro transformer and a second servo motor energized therefrom and each having movable coils gear-coupled to said last mentioned micrometer screw, said second transformer and servo motor being carried by said last mentioned framework, a second remote synchro generator having an adjustable movable coil and having fixed coils electrically connected to fixed coils of said second synchro generator, and means for jointly adjusting the movable coils of said remote synchro generators.

3. The combination according to claim 2 including electromagnetic means in each camera for controlling the axial position of the lens assembly in its respective housing means and remote control means for conjointly controlling said electromagnetic means for simultaneous and equal change of focus.

4. The combination according to claim 2 wherein the lens assembly of each of the three cameras includes an iris diaphragm and wherein each assembly is coaxially mounted in an inner rigid ring member which, in turn, is coaxially mounted within and spaced from an outer rigid ring member by annular members of flexible material, said outer ring member being fixed against movement in the housing means, and electromagnetic means coupled to said inner ring member for moving said ring member longitudinally of its axis for axial movement of the lens assembly relative to the housing means.

5. The combination according to claim 4 wherein the lens assembly of each camera includes an iris control gear, a worm gear carried by each housing means and coupled to the iris control gear for driving the same, and means including separable magnetic couplings for conjoint drive of all of said worm gears.

6. The combination according to claim 3 including guideways on said platform, said cameras being carried on said guideways and movable thereon from a forward operative position to a retracted reloading position, said remote control means for conjointly controlling said electromagnetic means and said remote control means for said micrometer screws being rendered operative only when said cameras are in their forward operative position.

7. The combination according to claim 5 including guideways on said platform, said cameras being carried on said guideways and movable thereon from a forward operative position to a retracted reloading position, means for conjoint drive of all of said worm gears including a main drive shaft rotatably supported from said platform, and a flexible shaft for each worm gear, said magnetic couplings connecting said flexible shafts to said main drive shaft in the forward position of said cameras.

8. The combination according to claim 7 wherein each of said magnetic couplings comprises a pair of permanent magnets having mating non-planar surfaces, one of each pair being carried by a worm gear shaft and the other of each pair being supported above the platform on a stub shaft at a position to present its non-planar surface to that of the worm gear shaft carried magnet when the camera is in the forward operative position on the platform, said stub shaft being mechanically coupled to said drive shaft.

References Cited in the file of this patent

UNITED STATES PATENTS

| | | |
|---|---|---|
| 852,476 | Verbeck | May 7, 1907 |
| 2,176,108 | Smith | Oct. 17, 1939 |
| 2,337,363 | Ames | Dec. 21, 1943 |
| 2,461,673 | Anschicks et al. | Feb. 15, 1949 |
| 2,583,030 | Waller et al. | Jan. 22, 1952 |
| 2,648,252 | Stancliff et al. | Aug. 11, 1953 |
| 2,687,668 | Dupy et al. | Aug. 31, 1954 |
| 2,711,668 | Dresser | June 28, 1955 |

FOREIGN PATENTS

| | | |
|---|---|---|
| 385,423 | France | Mar. 16, 1908 |
| 614,473 | Great Britain | Dec. 16, 1948 |